United States Patent
Miyamoto

(10) Patent No.: US 6,808,302 B2
(45) Date of Patent: Oct. 26, 2004

(54) BACKLIGHT DEVICE

(75) Inventor: Hirofumi Miyamoto, Kawasaki (JP)

(73) Assignee: Fujitsu Display Technologies Corporation, Kawasaki (JP)

( * ) Notice: Subject to any disclaimer, the term of this patent is extended or adjusted under 35 U.S.C. 154(b) by 0 days.

(21) Appl. No.: 10/308,207

(22) Filed: Dec. 2, 2002

(65) Prior Publication Data

US 2003/0117710 A1 Jun. 26, 2003

(30) Foreign Application Priority Data

Dec. 20, 2001 (JP) ........................................ 2001-388174

(51) Int. Cl.[7] .............................................. F21V 29/00
(52) U.S. Cl. .................... 362/580; 362/31; 362/218; 362/561; 362/581; 349/58
(58) Field of Search .............................. 349/58–62, 65, 349/70; 362/29, 31, 217, 218, 263, 264, 294, 561, 580, 581; 313/11, 22, 23, 24

(56) References Cited

U.S. PATENT DOCUMENTS

| | | | |
|---|---|---|---|
| 6,219,116 B1 * | 4/2001 | Yuuki et al. | 349/58 |
| 6,341,879 B1 * | 1/2002 | Skinner et al. | 362/295 |
| 6,411,042 B1 * | 6/2002 | Cull et al. | 315/115 |
| 6,417,832 B1 * | 7/2002 | Skinner et al. | 345/102 |

* cited by examiner

Primary Examiner—John Anthony Ward
(74) Attorney, Agent, or Firm—Greer, Burns & Crain, Ltd.

(57) ABSTRACT

The present invention provides a backlight device that has a heat-generating light source, such as a fluorescent tube. This backlight device includes; fluorescent tubes that emit light when power is supplied to the fluorescent tube electrodes; and a light guide plate that guides the light emitted from the fluorescent tubes to a liquid crystal panel. In this backlight device, heat release members for releasing the heat from the fluorescent tube electrodes are provided at the corners of the light guide plate that face the fluorescent tube electrodes of the fluorescent tubes. With these heat release members, the light guide plate is prevented from melting.

11 Claims, 9 Drawing Sheets

BACKLIGHT DEVICE

BACKGROUND OF THE INVENTION

The present invention generally relates to backlight devices, and, more particularly, to a backlight device that has a heat-generating light source such as a fluorescent tube.

Conventional display devices normally include CRTs (cathode-ray tubes), but, these CRT displays are being rapidly replaced by flat panel displays that employ liquid crystal panels. These liquid crystal displays have higher display quality today, and therefore are expected to become larger in size and have a higher luminance for use in television sets. Accordingly, backlight devices for illuminating the liquid crystal panels are also expected to have higher luminance.

Conventional liquid crystal displays are used mainly for notebook type personal computers, land the screen size is normally limited to 13 inches. The resolution is XGA at the highest, and the display luminance is only as high as 150 cd/m$^2$. FIGS. 1A, 1B, and 2 illustrate a liquid crystal display 1A of this type.

The liquid crystal display 1A includes a liquid crystal panel 2A, a housing 5, and a backlight device 10A. The housing 5 holds the liquid crystal panel 2A and the backlight device 10A with a resin frame 6 and a backboard 9. The backlight device 10A illuminates the liquid crystal panel 2A from the back, and gives a predetermined luminance to the display screen of the liquid crystal panel 2A.

The backlight device 10A includes a fluorescent tube 3 that serves as a light source, a rubber holder 12 (shown in FIG. 5) that holds the fluorescent tube 3, and a light guide plate 4 that guides the light from the fluorescent tube 3 to the liquid crystal panel 2A. The fluorescent tube 3 contains Ar gas or Ne gas in which mercury is sealed, and the tube wall of the fluorescent tube 3 is coated with a fluorescent material. The mercury gas radiates ultraviolet rays during electric discharge, and the ultraviolet rays then strike the fluorescent material to generate visible rays.

The light guide plate 4 is an acrylic resin plate that cooperates with a provided optical sheet 8 to illuminate the entire area of the liquid crystal panel 2A with the light guided from the fluorescent tube 3. In the liquid crystal display 1A that has a small screen size (approximately 13 inches, as shown in FIG. 1A) and is not required to have a high resolution and a high screen luminance, the backlight device 10A is provided only by one side of the light guide plate 4, and only the single fluorescent tube 3 is employed.

On the other hand, a liquid crystal display 1B for monitoring, which is shown in FIGS. 3A through 5C, normally has a display size of 15 inches, and is required to have a SXGA resolution and a screen luminance of approximately 250 cd/m$^2$. For this reason, two backlight devices 10B are incorporated into the liquid crystal display 1B, with the light guide plate 4 being interposed in between. Further, two fluorescent tubes 3 are provided for each of the backlight devices 10B. As DVD drives for personal computers have been widely spread, however, liquid crystal displays for monitoring are expected to have a larger and brighter screen, so that users can enjoy movies on the screen of the liquid crystal display.

The problem with the liquid crystal display 1B is that the fluorescent tubes 3 provided for each of the backlight devices 10B generate heat as well as light. A temperature rise in the vicinity of the fluorescent tube electrode 11 of each of the fluorescent tubes 3 is particularly large. When the supply current is increased to obtain a higher luminance, the temperature becomes as high as 120° C. or even higher. The fluorescent tube electrodes 11 are located at both ends of each of the fluorescent tubes 3. To accommodate each fluorescent tube electrode 11, a heat-conductive rubber holder 12 is provided at both ends of each of the fluorescent tubes 3. Each rubber holder 12 is engaged with the corresponding holder 7, so that both ends of each of the fluorescent tubes 3, where the temperature rises by the greatest degree, can be cooled down.

The rubber holders 12 are situated near the light guide plate 4, and directly face the light guide plate 4. Because of this arrangement, the heat generated by each fluorescent tube electrode 11 is transferred to the light guide plate 4 via the corresponding rubber holder 12.

Due to the heat generated by the fluorescent tube electrodes 11, there is always a risk of melting the part (indicated by the arrow B in FIG. 5C) of the resin light guide plate 4, which faces the fluorescent tube electrodes 11 in each of the conventional backlight devices 10B. When melted in this manner, the light guide plate 4 is deformed and deteriorates. A deformed light guide plate 4 cannot properly guide the light from the fluorescent tubes 3 to the liquid crystal panel 2B, resulting in decreases in the luminance and resolution of the display screen. If the liquid crystal display 1B becomes larger in size and generates a greater amount of heat from the fluorescent tube electrodes 11, this problem will be aggravated even further.

SUMMARY OF THE INVENTION

A general object of the present invention is to provide backlight devices in which the above disadvantages are eliminated.

A more specific object of the present invention is to provide a backlight device that can prevent the light guide plate from melting, even when the temperature rises due to the heat generated by the light source.

The above objects of the present invention are achieved by a backlight device that includes: a light source that emits light when power is supplied to electrodes thereof; a light guide plate for guiding the light emitted from the light source to a liquid crystal panel; and heat release members for releasing heat generated by the electrodes, the heat release members being located at least either at the electrodes of the light source or at the corners of the light guide plate facing the electrodes.

In this backlight device, the heat release members are located at the positions between the light guide plate and the electrodes, where the heat generated by the light source is most likely to build up. To release the heat, the heat release members are placed by the side of each electrode of the light source, or at the corners of the light guide plate facing the electrodes. Alternatively, the heat release members may be placed both by the side of each electrode and at the corners of the light guide plate.

In this structure, the heat generated by the light source can be released through the heat release members placed between the light guide plate and the electrodes. As a result, the light guide plate can be prevented from melting due to heat generation, even when the light source has a higher luminance and a larger amount of heat is generated by the light source. Thus, the deformation and deterioration of the light guide plate can be avoided.

The above objects of the present invention are also achieved by a liquid crystal display that includes: a liquid crystal panel; the backlight device of the present invention; and a light guide plate that is provided at the light-entering surface side of the backlight device, and guides the light emitted from the backlight device to the liquid crystal panel.

The above and other objects and features of the present invention will become more apparent from the following description taken in conjunction with the accompanying drawings.

DESCRIPTION OF THE PREFERRED EMBODIMENTS

The following is a description of embodiments of the present invention, with reference to the accompanying drawings.

Figure 1B:
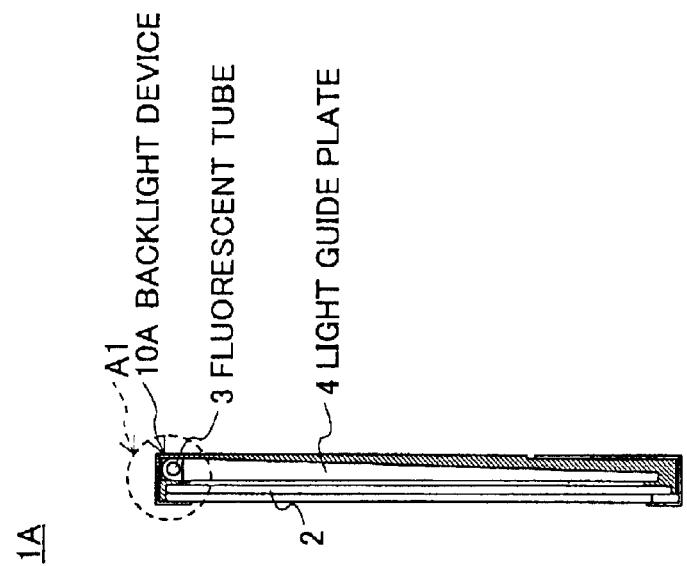
FIGS. 1A and 1B illustrate a liquid crystal display having a small-sized screen and a conventional backlight device.
Figure 1A:
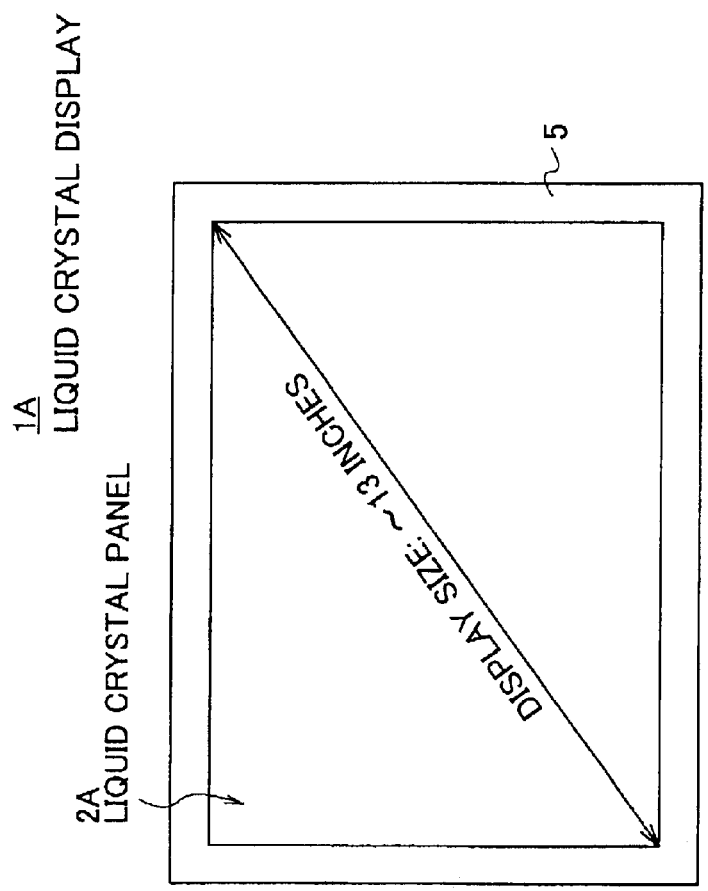
Figure 2:
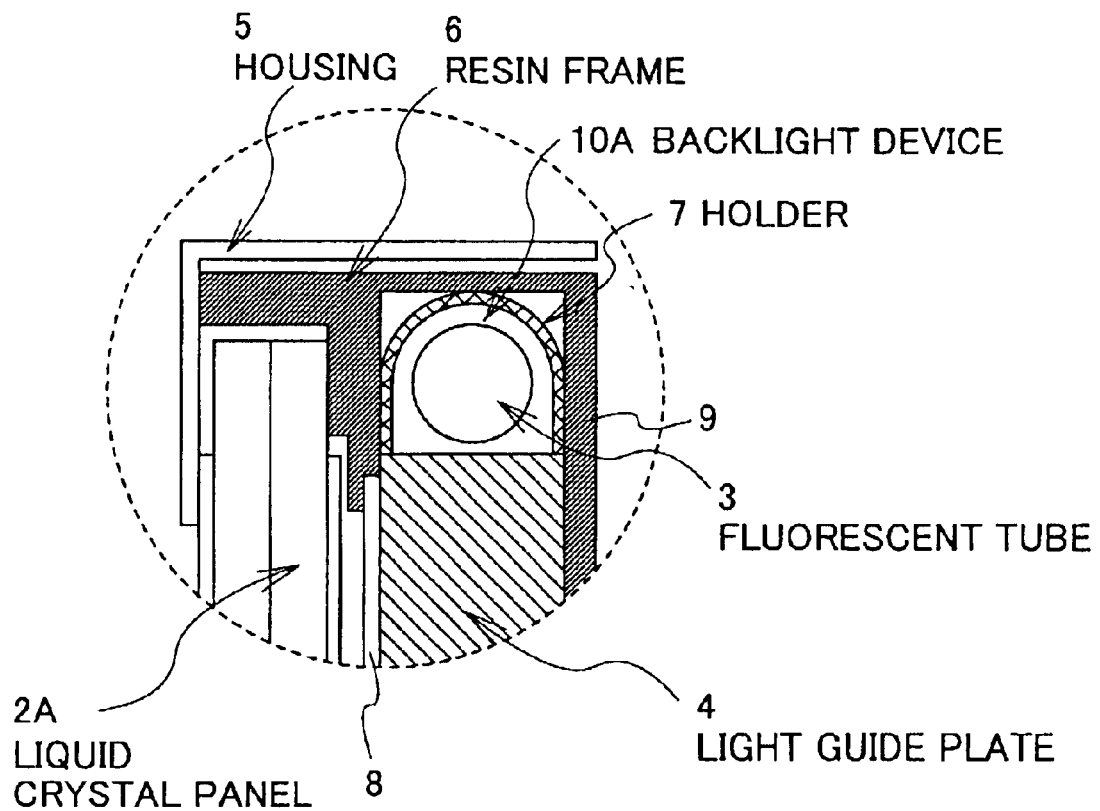
FIG. 2 is an enlarged view of the part indicated by the arrow A1 in FIG. 1B.
Figure 3B:
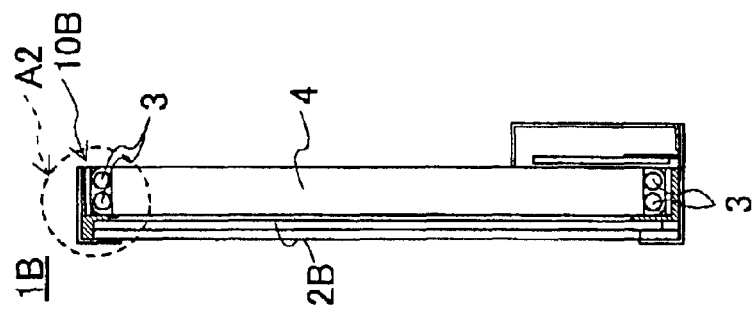
FIGS. 3A and 3B illustrate a liquid crystal display having a large-sized screen and conventional backlight devices.
Figure 3A:
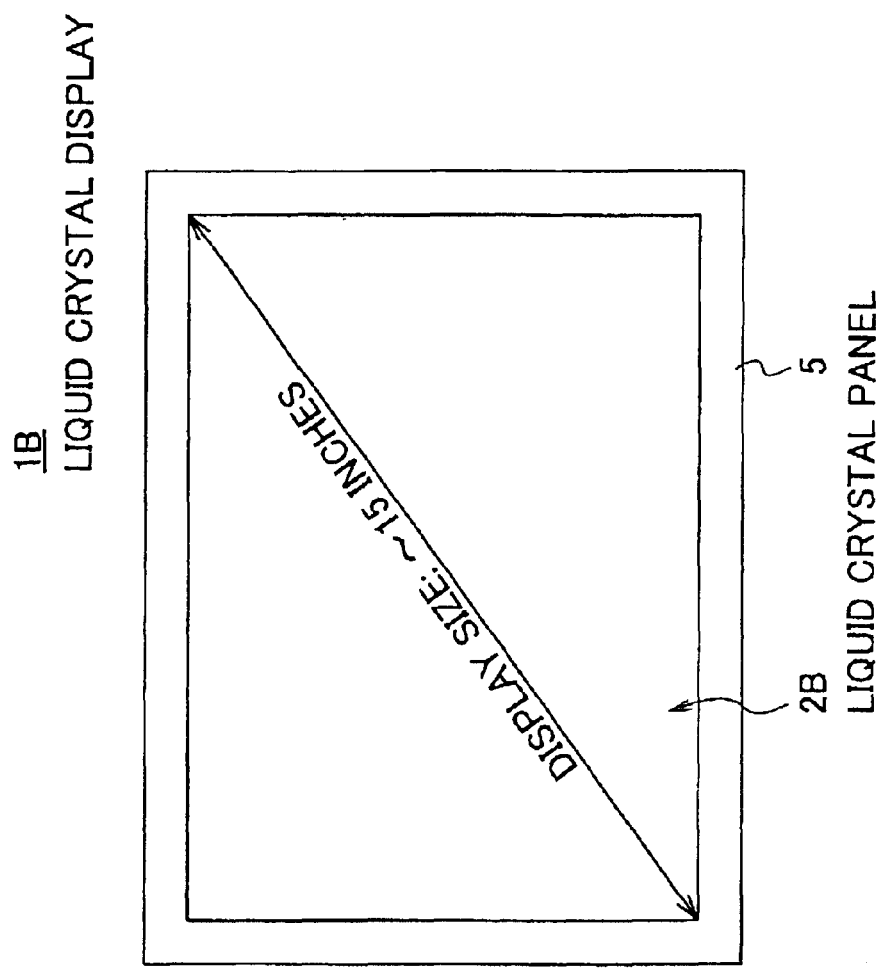
Figure 4:
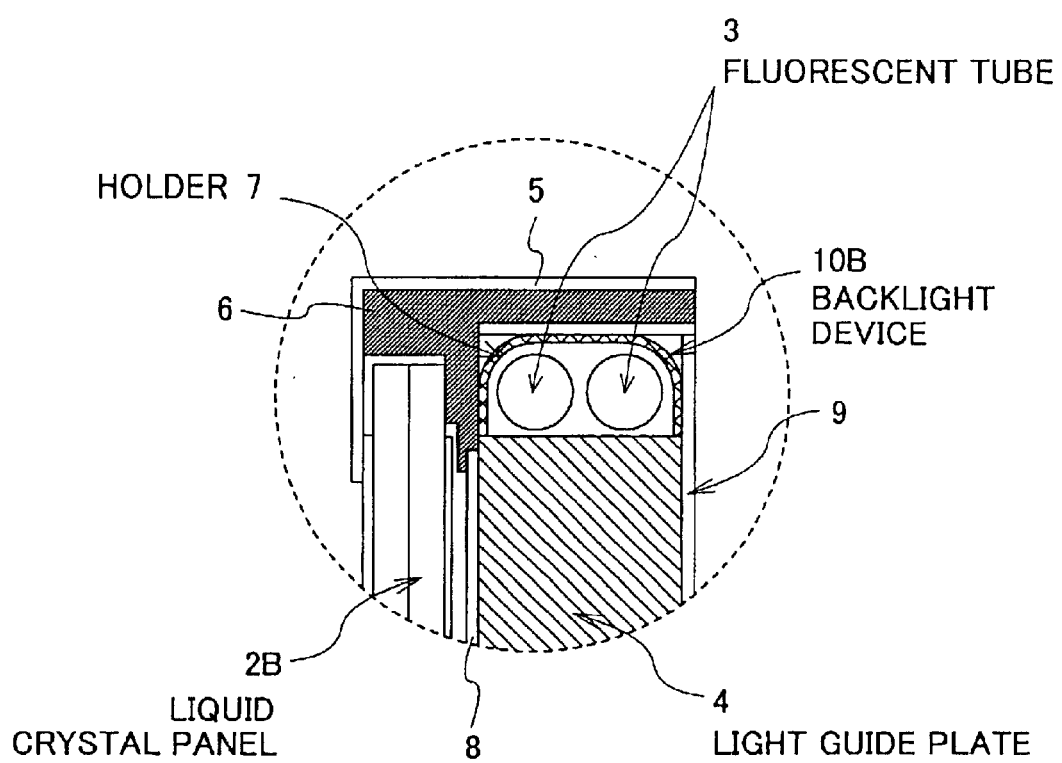
FIG. 4 is an enlarged view of the part indicated by the arrow A2 in FIG. 3B.
Figure 5A:
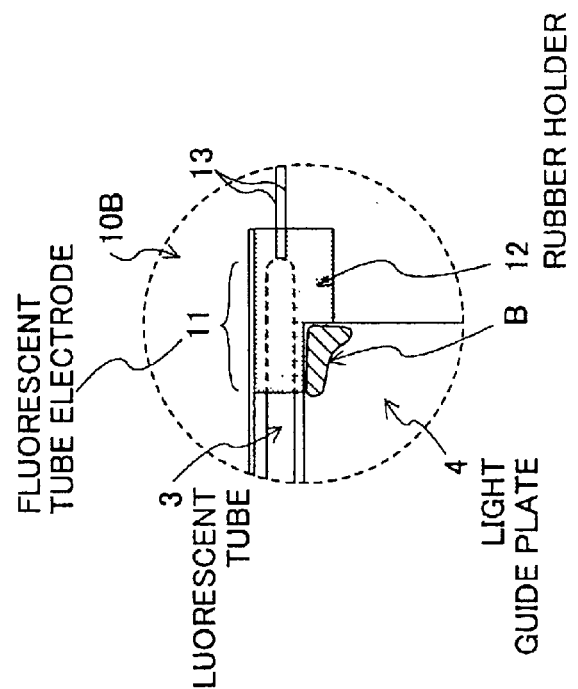
FIGS. 5A through 5C illustrate the problem with the conventional backlight devices.
Figure 5B:
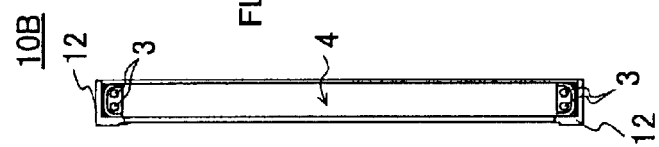
Figure 5C:
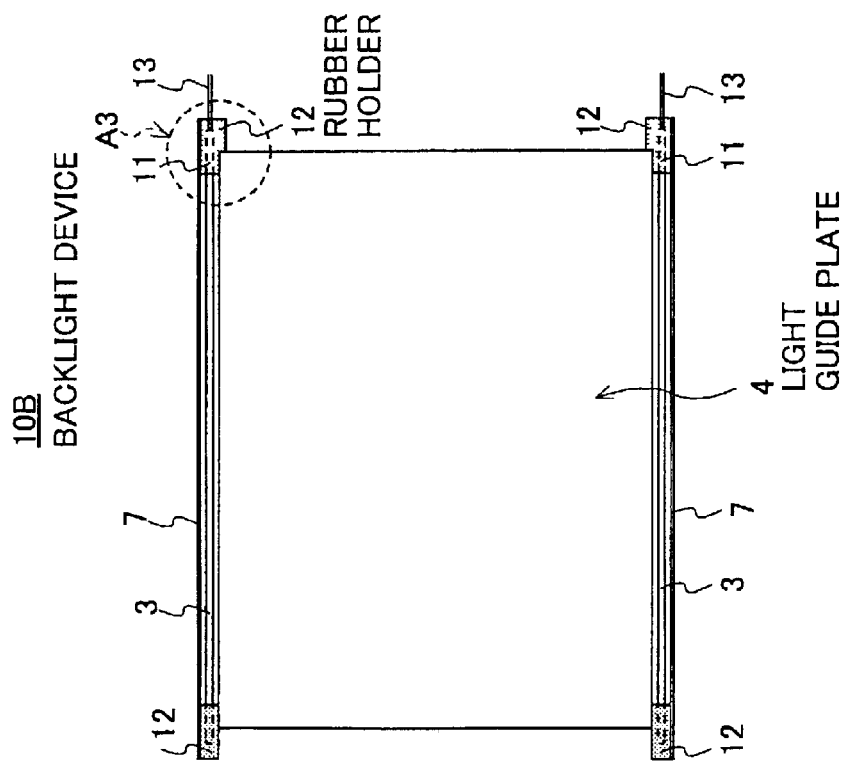
Figure 6A:
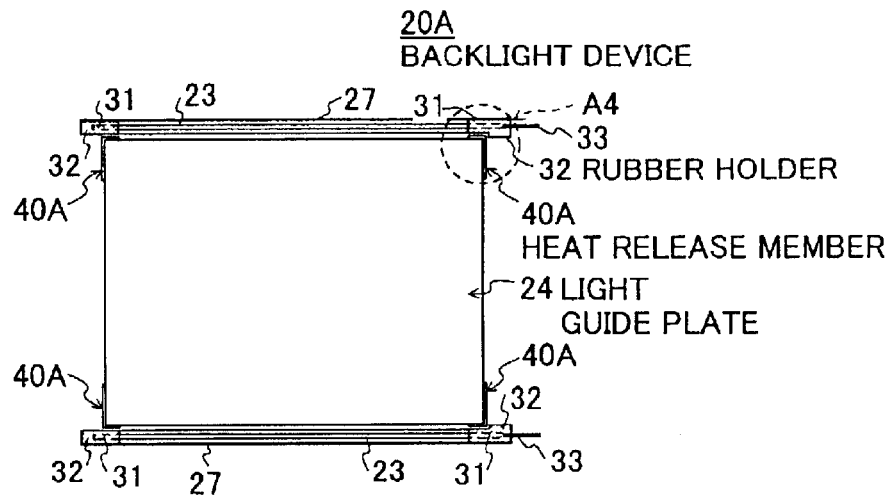
FIG. 6A is a plan view of a backlight device that is a first embodiment of the present invention.
Figure 6B:
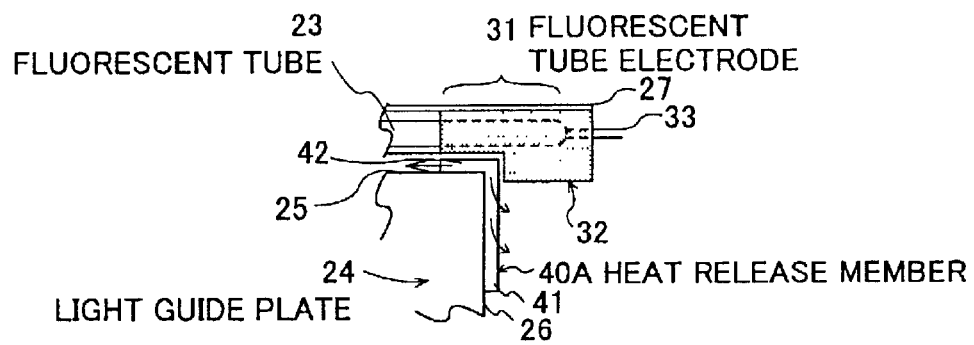
FIG. 6B is an enlarged view of the part indicated by the arrow A4 in FIG. 6A.
Figure 6C:
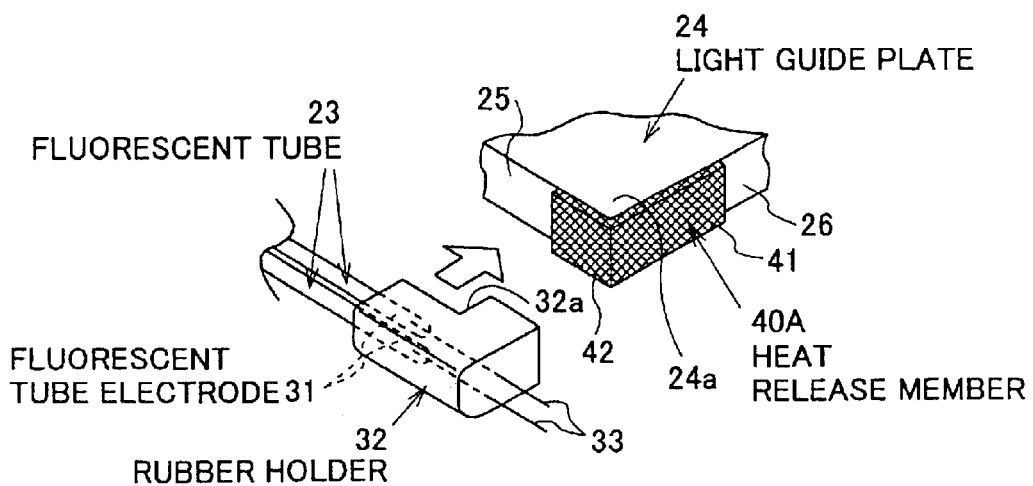
FIG. 6C is an exploded perspective view of the part indicated by the arrow A4 in FIG. 6A.

FIGS. 6A through 6C illustrate a backlight device 20A that is the first embodiment of the present invention. This backlight device 20A is incorporated into a liquid crystal display device. It should be noted that the backlight device 20A of this embodiment is provided in the same arrangement as shown in FIGS. 3A through 4. In FIGS. 6A through 6B, the same components as in FIGS. 3A through 4 are denoted by the same reference numerals as in FIGS. 3A through 4.

The backlight device 20A includes fluorescent tubes 23, a light guide plate 24, holders 27, rubber holders 32, and heat release members 40A.

The fluorescent tubes 23 are cold cathode tubes, and the light guide plate 24 is interposed between the two fluorescent tubes 23, as shown in FIG. 6A. In each of the fluorescent tubes 23, Ar gas and Ne gas, as well as mercury, are sealed in a glass tube, and the tube wall is coated with a fluorescent material.

A fluorescent tube electrode 31 is internally provided at both ends of each of the fluorescent tubes 23. A wire 33 that is connected to each fluorescent tube electrode 31 extends outward. When the wire 33 is energized, the corresponding fluorescent tube electrode 11 discharges, and the mercury gas then radiates ultraviolet rays. The ultraviolet rays strike the fluorescent material to radiate visible rays.

A rubber holder 32 is provided at both ends of each of the fluorescent tubes 23, so that each of the fluorescent tubes 23 is fixed to each corresponding holder 27 with the rubber holder 32.

Each of the holders 27 is made of a metal material, such as SUS, steel, or aluminum, and extends along each corresponding fluorescent tube 23. A silver deposition layer or a white reflecting layer is formed on the surface of each holder 27 facing the fluorescent tubes 23, so that the light emitted from the fluorescent tubes 23 can be efficiently reflected. By doing so, the light emitted from the fluorescent tubes 23 can be prevented from dispersing and be efficiently guided to the light guide plate 24.

Each of the rubber holders 32 has highly conductive metal particles as filler contained in silicone rubber, for instance, and has high heat conductivity. The rubber holders 32 are located at the four corners of the light guide plate 24. Because of this, each of the rubber holders 32 has an L-shaped step part 32a. The step parts 32a are engaged with the corner parts 24a of the light guide plate 24, so that the fluorescent tubes 23 are positioned with respect to the light guide plate 24.

The light guide plate 24 is made of a resin material having a high transparency, such as acrylic. The light guide plate 24 faces the back of the liquid crystal panel 2B. Each of the fluorescent tubes 23 faces the corresponding light-entering side 25 of the light guide plate 24, as shown in FIGS. 6B and 6C.

The optical sheet 8 is placed at the front side of the light guide plate 24. This optical sheet 8 gathers and disperses the light that is emitted from the light guide plate 24, so that the light can be efficiently guided to the liquid crystal panel 2B. Also, a reflecting sheet (not shown) is provided at the back of the light guide plate 24. This reflecting sheet reflects light that leaks from the light guide plate 24, so that the leaking light is returned into the light guide plate 24.

The heat release members 40A are the essential parts of the present invention. As shown in FIGS. 6B and 6C, each of the heat release members 40A is an L-shaped metal plate. More specifically, each of the heat release members 40A is formed by an aluminum plate that has a high heat release rate, and consists of a first heat release part 41 and a second heat release part 42 that are integrally formed and are perpendicular to each other.

Each of the heat release members 40A is bonded to the corresponding corner part 24a of the light guide plate 24 with double-faced adhesive tape (not shown) that has a highly heat-conductive adhesive agent applied to both sides. Being fixed to the corner parts 24a, the first heat release parts 41, which are longer than the second heat release parts 42, are located on the sides 26 of the light guide plate 24, while the second heat release parts 42, which are shorter than the first heat release parts 41, are located on the light-entering sides 25 of the light guide plate 24.

The rubber holders 32 are bonded to the heat release members 40A fitted to the corners 24a of the light guide plate 24 in the above described manner. As described above, each of the rubber holders 32 has the step part 32a, and the corresponding heat release member 40A is bonded to the step part 32a. Accordingly, the light guide plate 24 and the rubber holders 32 are bonded with the heat release members 40A. As shown in FIG. 6B, with the rubber holders 32 being fixed to the light guide plate 24, the end of each rubber holder 32 substantially meets the end of the corresponding second heat release part 42 at the side of the corresponding fluorescent tube 23.

Although the rubber holders 32 are bonded to the light guide plate 24 after the heat release members 40A are bonded to the light guide plate 24 in this embodiment, the rubber holders 32 may be bonded to the heat release members 40A before the light guide plate 24 is bonded to the heat release members 40A. Also, the heat release members 40A are not necessarily mechanically fixed to, or directly in contact with the light guide plate 24, as long as the heat release members 40A are thermally connected to the light guide plate 24. The same applies to the bonding between the heat release members 40A and the rubber holders 32.

In the backlight device 20A of this embodiment, the heat release members 40A are located at the positions between the light guide plate 24 and fluorescent tube electrodes 11, where the heat generated by the fluorescent tubes 23 tends to build up. In this arrangement, the heat generated by the fluorescent tubes 23 (more particularly, the heat generated by the fluorescent tube electrodes 11) reaches the heat release members 40A via the rubber holders 32, and is then released through the heat release members 40A, as indicated by the arrows in FIG. 6B.

In this structure, even when the amount of heat generated by the fluorescent tubes 23 increases as the luminance of the fluorescent tubes 23 becomes higher with the increasing size of the liquid crystal panel 2B, the light guide plate 24 can be prevented from melting due to the heat generated by the fluorescent tubes 23. Thus, the deformation and deterioration of the light guide plate 24 can be avoided. As a result, decreases in the luminance and the resolution of the display screen due to the heat generated by the backlight device 20A can be attenuated.

Since each of the heat release members 40A has an L-shape in this embodiment, the release members 40A cover the corner parts 24a of the light guide plate 24, so that the heat generated by the fluorescent tube electrodes 31 cannot reach the light guide plate 24.

In an experiment carried out by the inventor of the present invention, the temperature at the corner parts 24a of the light guide plate 24 was decreased to 55° C. in the backlight device 20A of this embodiment. In a conventional backlight device, by comparison, the temperature at the corner parts of the light guide plate was approximately 100° C.

Figure 7A:
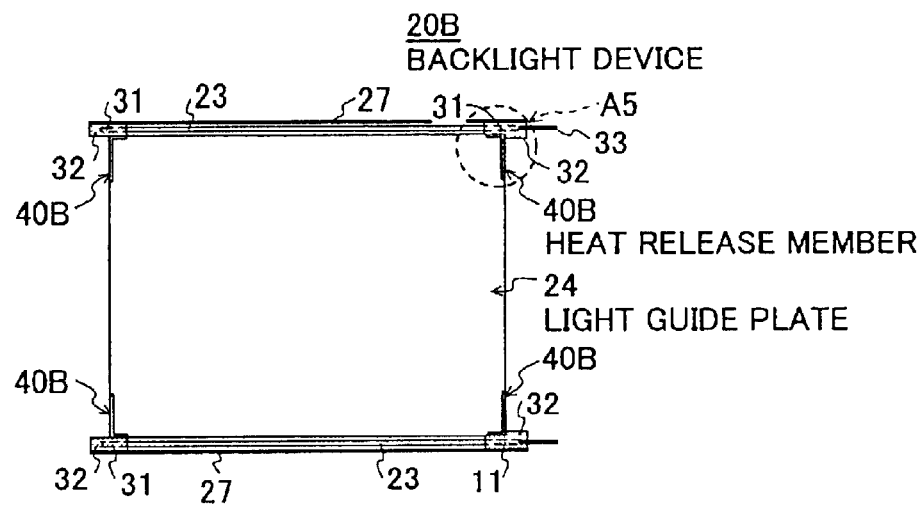
FIG. 7A is a plan view of a backlight device that is a second embodiment of the present invention.
Figure 7B:
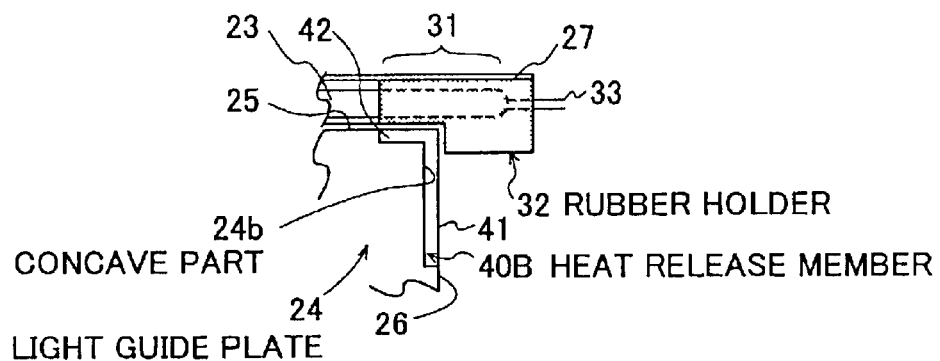
FIG. 7B is an enlarged view of the part indicated by the arrow A5 in FIG. 7A.
Figure 7C:
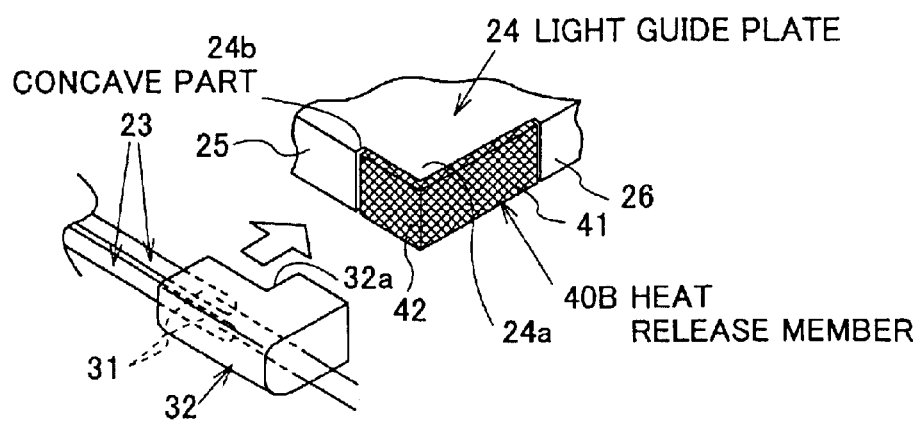
FIG. 7C is an exploded perspective view of the part indicated by the arrow A5 in FIG. 7A.

Referring now to FIGS. 7A through 7C, the second embodiment of the present invention will be described. FIGS. 7A through 7C show a backlight device 20B that is the second embodiment of the present invention. In FIGS. 7A through 7C, the same components as in the structure of the first embodiment shown in FIGS. 6A through 6C are denoted by the same reference numerals as in FIGS. 6A through 6C, and explanation of those components is omitted. This applies as well to FIGS. 8A through 9C illustrating third and fourth embodiments of the present invention.

In the backlight device 20A of the first embodiment, the heat release members 40A are placed at the corner parts 24a of the flat-panel type light guide plate 24. In such a structure, the first heat release part 41 and the second heat release part 42 of each of the heat release members 40A protrude from the side 26 and the light-entering side 25 of the light guide plate 24 by a distance equivalent to the thickness of each of the heat release members 40A.

With the second heat release parts 42 protruding from the light-entering sides 25, however, a gap that is equivalent to the thickness of each second heat release part 42 is formed between each light-entering side 25 and the corresponding fluorescent tubes 23. As a result, the amount of light entering from the fluorescent tubes 23 into the light guide plate 24 decreases, and so does the luminance.

To solve this problem, a concave part 24b of a shape corresponding to the shape of the heat release member 40B is formed at each corner part 24a of the light guide plate 24 in the backlight device 20B of this embodiment. In such a structure, each of the heat release members 40B is fitted into the corresponding concave part 24b of the light guide plate 24. Here, the outer face of each first heat release part 41 lies in the same plane as the corresponding side 26, and the outer face of each second heat release part 42 lies in the same plane as the corresponding light-entering side 25.

In this structure, the heat release members 40B are fitted into the light guide plate 24 so as to not protrude from the light-entering sides 25 and the sides 26 of the light guide plate 24. Accordingly, the gap between each fluorescent tube 23 and the corresponding light-entering side 25 of the light guide plate 24 becomes smaller than in the first embodiment.

In this structure, the incident rate of the light emitted from the fluorescent tubes 23 into the light guide plate 24 increases, and so does the luminance of the display screen. Meanwhile, the heat release members 40B have the same heat release effect as the heat release members 40A of the first embodiment, so that the light guide plate 24 can be prevented from melting.

Figure 8A:
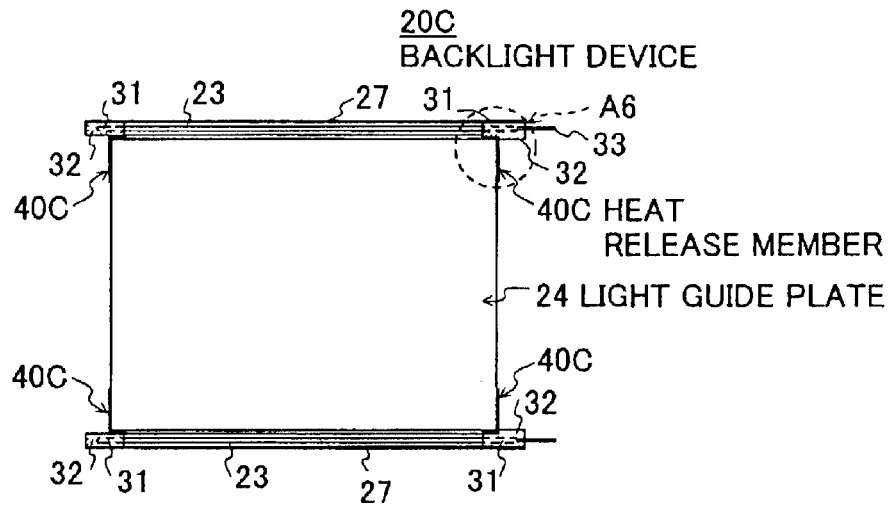
FIG. 8A is a plan view of a backlight device that is a third embodiment of the present invention.
Figure 8B:
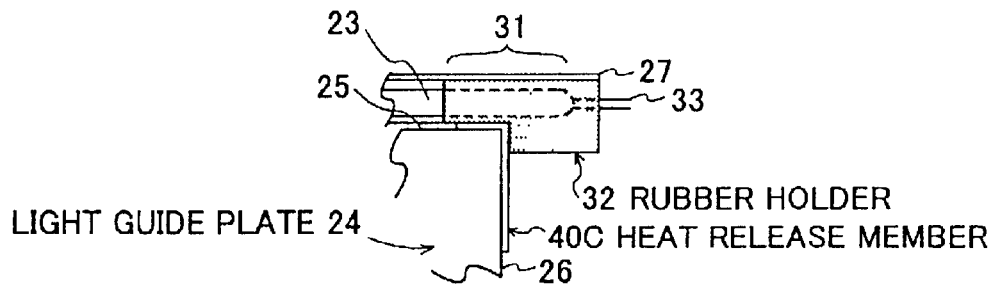
FIG. 8B is an enlarged view of the part indicated by the arrow A6 in FIG. 8A.
Figure 8C:
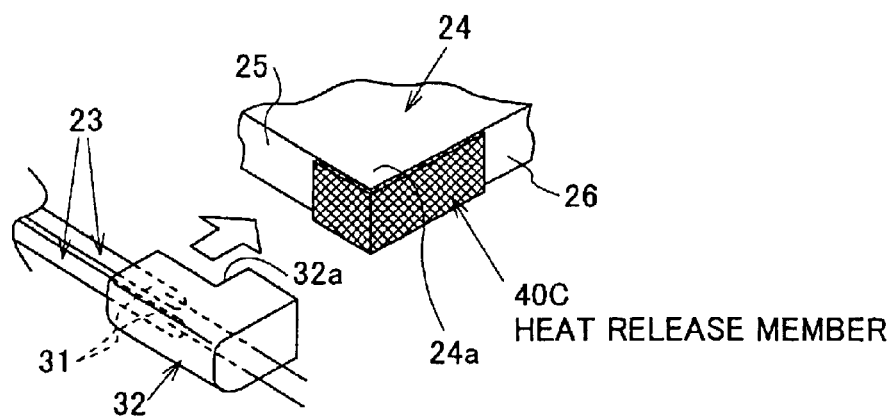
FIG. 8C is an exploded perspective view of the part indicated by the arrow A6 in FIG. 8A.

Referring now to FIGS. 8A through 8C, the third embodiment of the present invention will be described. FIGS. 8A through 8C illustrate a backlight device 20C that is the third embodiment of the present invention.

As described above, since the heat release members 40A protrude from the light guide plate 24 in the first embodiment, there is risk of decreasing the amount of light entering into the light guide plate 24 from the fluorescent tubes 23 in the backlight device 20A. In the backlight device 20B of the second embodiment, on the other hand, a decrease of the amount of light entering into the light guide plate 24 can be prevented, but the production costs of the light guide plate 24 increase because of the addition of the concave parts 24b to the light guide plate 24.

To solve these problems, the heat release members 40C are formed by thin-film type metallic tape in the backlight device 20C of this embodiment. The thin-film type metallic tape used for the heat release members 40C may be formed by metallic foil made of a metallic material such as aluminum, or by laminating a thin film on a tape material that is made mainly of aluminum.

As the heat release members 40C are formed by the thin-film type metallic tape, the protrusion of the heat release members 40 from the light guide plate 24 can be reduced (compared to the first embodiment) in the backlight device 20C of this embodiment. In this structure, the gap between each fluorescent tube 23 and the corresponding light entering side 25 of the light guide plate 24 becomes smaller as in the backlight device 20B of the second embodiment. As a result, the incident rate of the light entering into the light guide plate 24 from the fluorescent tubes 23 increases accordingly.

Meanwhile, as the heat release members 40C have the same heat release effect as the heat release members 40A of the first embodiment, the light guide plate 24 can be prevented from melting. Furthermore, there is no need to form the concave parts 24b in the light guide plate 24 as in the second embodiment, and a widely used material can be used as the thin-film type metallic tape. Because of these facts, the production costs of the backlight device 20C of this embodiment are lower than the production costs of the backlight device 20B of the second embodiment.

Figure 9A:
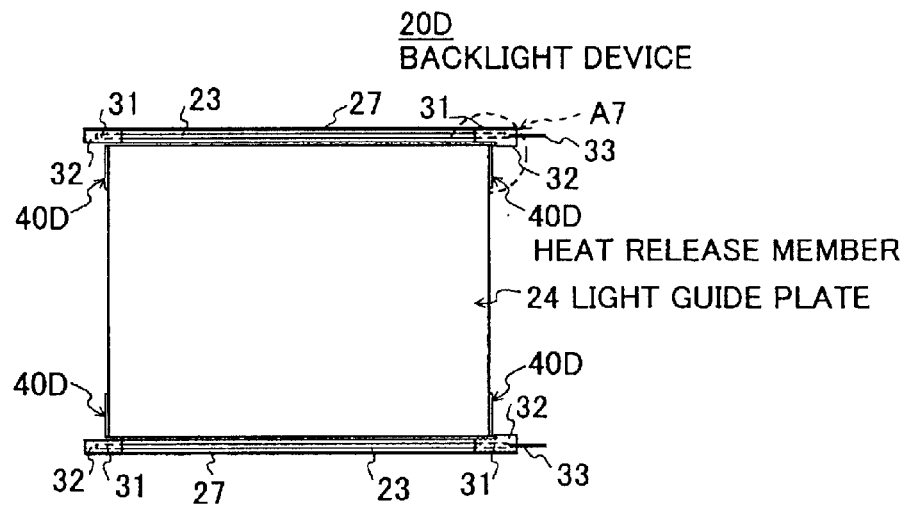
FIG. 9A is a plan view of a backlight device that is a fourth embodiment of the present invention.
Figure 9B:
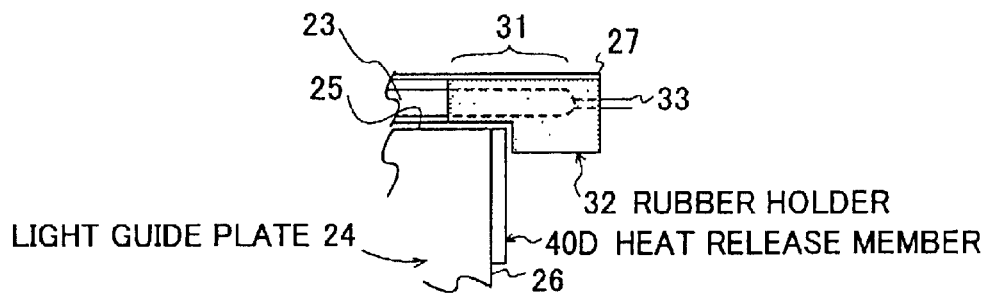
FIG. 9B is an enlarged view of the part indicated by the arrow A7 in FIG. 9A.
Figure 9C:
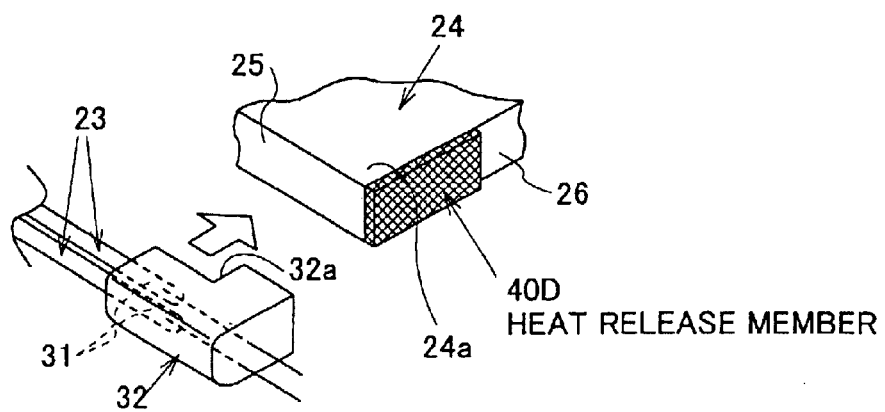
FIG. 9C is an exploded perspective view of the part indicated by the arrow A7 in FIG. 9A.

Referring now to FIGS. 9A through 9C, the fourth embodiment of the present invention will be described. FIGS. 9A through 9C illustrate a backlight device 20D that is the fourth embodiment of the present invention.

In the backlight device 20A of the first embodiment, each of the heat release members 40A has an L-shaped structure, consisting of the first heat release part 41 and the second heat release part 42. In the backlight device 20D of this embodiment, on the other hand, each heat release member 40D takes the form of a flat plate. Because of this simple form, the heat release members 40D can contribute to reducing the production costs.

Also, each of the heat release members 40D of the flat-plate type is placed at the corresponding side 26 of the light guide plate 24, i.e., at the corresponding outer peripheral side of the light guide plate 24 not facing the fluorescent tubes 23. As the heat release members 40D do not exist at positions between the light guide plate 24 and the fluorescent tubes 23, the gap between each fluorescent tube 23 and the corresponding light-entering side 25 becomes smaller compared to embodiments 1 and 3. The incident rate of the light entering into the light guide plate 24 from the fluorescent tubes 23 increases accordingly.

Although the light guide plate 24 is in direct contact with the fluorescent tube electrodes 31 at the corners 24a in this embodiment, the heat entering into the light guide plate 24 from the fluorescent tube electrodes 31 is immediately transferred to the heat release members 40D, through which the heat is released. In this manner, the light guide plate 24 is prevented from melting.

It should be noted that the present invention is not limited to the embodiments specifically disclosed above, but other variations and modifications may be made without departing from the scope of the present invention.

What is claimed is:

1. A backlight device comprising:
   a light source that emits light when power is supplied to electrodes thereof;
   a light guide plate for guiding the light emitted from the light source to a liquid crystal panel, the light guide plate having sides, at least one of the sides being opposed to the light source; and
   heat release members for releasing heat generated by the electrodes, the heat release members being located at the corners of the light guide plate facing the electrodes and being opposed to at least one side of the light guide plate.

2. The backlight device as claimed in claim 1, wherein each of the heat release members is an L-shaped metal plate.

3. The backlight device as claimed in claim 2, wherein
   a concave part that has a shape conforming to the L-shaped metal plate is formed at each of the corner parts of the light guide plate, and
   one of the L-shaped metal plates is fitted into each concave part.

4. The backlight device as claimed in claim 1, wherein each of the heat release members is a flat metal plate.

5. The backlight device as claimed in claim 4, wherein the flat metal plate is placed at a corresponding outer peripheral side of the light guide plate that does not face the light source.

6. The backlight device as claimed in claim 1, wherein each of the heat release members is formed by thin-film type metallic tape.

7. A liquid crystal display comprising:
   a liquid crystal panel;
   a backlight device that includes: a light source that emits light when power is supplied to electrodes thereof; a light guide plate for guiding the light emitted from the light source to the liquid crystal panel, the light guide plate having sides, at least one of the sides being opposed to the light source; and heat release members for releasing heat generated by the electrodes, the heat release members being located at the corners of the light guide plate and being opposed to the least one side of the light guide plate; and
   a light guide plate that is provided at the light-entering side of the backlight device, and guides the light emitted from the backlight device to the liquid crystal panel.

8. A backlight device comprising:
   a light source that emits light when power is supplied to electrodes thereof;
   a light guide plate for guiding the light emitted from the light source to a liquid crystal panel; and
   heat release members for releasing heat generated by the electrodes, the heat release members being located at least either by the sides of the electrodes of the light source or at the corners of the light guide plate facing the electrodes;
   wherein each of the heat release members is an L-shaped metal plate,
   a concave part that has a shape conforming to the L-shaped metal plate is formed at each of the corner parts of the light guide plate, and
   one of the L-shaped metal plates is fitted into each concave part.

9. The backlight device as claimed in claim 8, wherein each of the heat release members is a flat metal plate.

10. The backlight device as claimed in claim 8, wherein the flat metal plate is placed at a corresponding outer peripheral side of the light guide plate that does not face the light source.

11. The backlight device as claimed in claim 8, wherein each of the heat release members is formed by thin-film type metallic tape.

* * * * *